United States Patent

Verman et al.

(10) Patent No.: US 6,643,353 B2
(45) Date of Patent: Nov. 4, 2003

(54) PROTECTIVE LAYER FOR MULTILAYERS EXPOSED TO X-RAYS

(75) Inventors: Boris Verman, Bloomfield, MI (US); Karsten Joensen, Copenhagen (DK); Yuriy Platonov, Troy, MI (US); Srivatsan Seshardi, Troy, MI (US)

(73) Assignee: Osmic, Inc., Auburn Hills, MI (US)

( * ) Notice: Subject to any disclaimer, the term of this patent is extended or adjusted under 35 U.S.C. 154(b) by 0 days.

(21) Appl. No.: 10/043,817

(22) Filed: Jan. 10, 2002

(65) Prior Publication Data

US 2003/0128810 A1 Jul. 10, 2003

(51) Int. Cl.$^7$ ................................. G21K 1/06
(52) U.S. Cl. ............................. 378/84; 378/85
(58) Field of Search ...................... 378/84, 85

(56) References Cited

U.S. PATENT DOCUMENTS

| | | |
|---|---|---|
| 4,525,853 A | 7/1985 | Keem et al. |
| 4,643,951 A | 2/1987 | Keem et al. |
| 4,675,889 A | 6/1987 | Wood et al. |
| 4,693,933 A | 9/1987 | Keem et al. |
| 4,716,083 A | 12/1987 | Eichen et al. |
| 4,717,632 A | 1/1988 | Keem et al. |
| 4,724,169 A | 2/1988 | Keem et al. |
| 4,727,000 A | 2/1988 | Ovshinsky et al. |
| 4,777,090 A | 10/1988 | Ovshinsky et al. |
| 4,783,374 A | 11/1988 | Custer et al. |
| 4,785,470 A | 11/1988 | Wood et al. |
| 4,867,785 A | 9/1989 | Keem et al. |
| 4,870,648 A | 9/1989 | Ceglio et al. |
| 5,082,621 A | 1/1992 | Wood |
| 5,163,078 A | 11/1992 | Iketaki |
| 5,167,912 A | 12/1992 | Wood |
| 5,265,143 A | 11/1993 | Early et al. |
| 5,310,603 A | 5/1994 | Fukuda et al. |
| 5,356,662 A | 10/1994 | Early et al. |
| 5,384,817 A | 1/1995 | Crowther et al. |
| 5,646,976 A | 7/1997 | Gutman |
| 5,757,882 A | 5/1998 | Gutman |
| 5,776,550 A | 7/1998 | Disam et al. |
| 5,799,056 A | 8/1998 | Gutman |
| 5,958,605 A * | 9/1999 | Montcalm et al. ............ 378/84 |
| 6,014,423 A | 1/2000 | Gutman et al. |
| 6,041,099 A | 3/2000 | Gutman et al. |
| 6,069,934 A | 5/2000 | Verman et al. |
| 6,330,301 B1 | 12/2001 | Jiang |
| 6,389,100 B1 | 5/2002 | Verman et al. |
| 6,421,417 B1 | 7/2002 | Jiang et al. |

FOREIGN PATENT DOCUMENTS

EP 0 769 787 A1 4/1997

OTHER PUBLICATIONS

J.H. Underwood et al., "Tarnishing of Mo/Si Multilayer X–Ray Mirrors," Applied Optics, vol. 32, No. 34, Dec. 1, 1993, pp. 6985–6990.

* cited by examiner

Primary Examiner—Craig E. Church

(57) ABSTRACT

An optical element for diffracting x-rays that includes a substrate, a diffraction structure applied to the substrate, the diffraction structure including an exterior surface facing away from the substrate and the diffraction structure capable of diffracting x-rays and a protective layer applied to the exterior surface.

45 Claims, 2 Drawing Sheets

PROTECTIVE LAYER FOR MULTILAYERS EXPOSED TO X-RAYS

BACKGROUND OF THE INVENTION

1. Field of the Invention

The present invention relates to a multilayer thin film structure for use with soft and hard x-rays, cold and thermal neutrons.

2. Discussion of Related Art

Thin film technology has been widely used to control the reflection and transmission of visible light. However, in the wavelength range of x-rays and neutrons the use of thin films has only recently become practicable. Recent advances in the quality control of Layered Synthetic Microstructures (LSM), or multilayers, allows the use of these structures as x-ray and neutron mirrors.

X-ray diffraction from multilayer mirrors is analogous to x-ray diffraction from perfect crystals where the lattice planes are located in the nodes of the standing wave produced by the superposition of incident and reflected (diffracted) waves for enhanced diffraction efficiency. Multilayer mirrors can be considered as an extension of natural crystals for larger lattice spacings. Therefore, as for crystals, x-ray photons will be reflected from multilayer structures only if the Bragg equation is met:

$$n\lambda = 2d \sin(\theta)$$

where $\lambda$=wavelength of the incident radiation d=layer-set spacing of a Bragg structure, or the lattice spacing of a crystal $\theta$=angle of incidence n=the order of the reflection The structure of a crystalline solid, a regular three dimensional array of atoms, forms a natural diffraction grating for x-rays. The quantity d in the Bragg equation is the perpendicular distance between the planes of atoms in the crystal. Crystalline structures can now be imitated by thin film multilayers, so x-ray diffraction is no longer limited to structures with naturally occurring d spacings.

In order for a multilayer structure to reflect by imitating a crystal structure, a light element of the lowest possible electron density is layered with a heavy element of the highest possible electron density. The heavy element layer acts like the planes of atoms in a crystal, as a scatterer, while the light element layer behaves like the spacers between the planes of atoms. A further requirement of these two elements is to minimize interdiffusion and interfacial roughness as much as possible.

Multilayers possess advantages over natural crystalline structures because by choosing the d spacing of a multilayer structure, devices may be fabricated for use with any wavelength and incidence angle. Crystals also possess poor mechanical qualities such as resistance to scratching. While some multilayer structures are known to scratch easily, this can be countered by depositing a top coat with better mechanical qualities. For example, a topcoat made of Si can be scratched. However, under proper conditions a topcoat made of Si can have its mechanical properties improved to such an extent that the Si topcoat resists scratching.

One disadvantage of multilayers is that they can undergo radiation enhanced damage when subjected to prolonged exposure of irradiation by hard x-rays. Such radiation enhanced damage can be broadly classified as 1) contamination coating on the surface of the multilayers, 2) structural damage, and 3) damage to the substrate. Any of the above classes of damage can contribute to the degradation of the performance of multilayers over time.

In the case of contamination coating, it involves a thin film caused by the deposition of contaminants from the atmosphere/surrounding environment onto the surface of the multilayers. The contamination coating generally contains elements like C, $O_2$, B, Si, etc. and can exist in the form of an oxide or an inorganic compound or both.

One known way to prevent contamination coating is to place the multilayers in a special environment like vacuum or Helium. However, using such a special environment can be cumbersome to work with and expensive to build and maintain.

Accordingly, it is an object of the present invention to design a multilayer structure that reduces the risk of radiation enhanced damage.

SUMMARY OF THE INVENTION

One aspect of the present invention regards an optical element for diffracting x-rays that includes a substrate, a diffraction structure applied to the substrate, the diffraction structure including an exterior surface facing away from the substrate and the diffraction structure capable of diffracting x-rays and a protective layer applied to the exterior surface.

An advantage of the above aspect of the present invention is that it reduces the risk of radiation enhanced damage in a normal environment.

Additional objects and advantages of the invention will become apparent from the following description and the appended claims when considered in conjunction with the accompanying drawings.

DETAILED DESCRIPTION OF THE PREFERRED EMBODIMENTS

Figure 1:
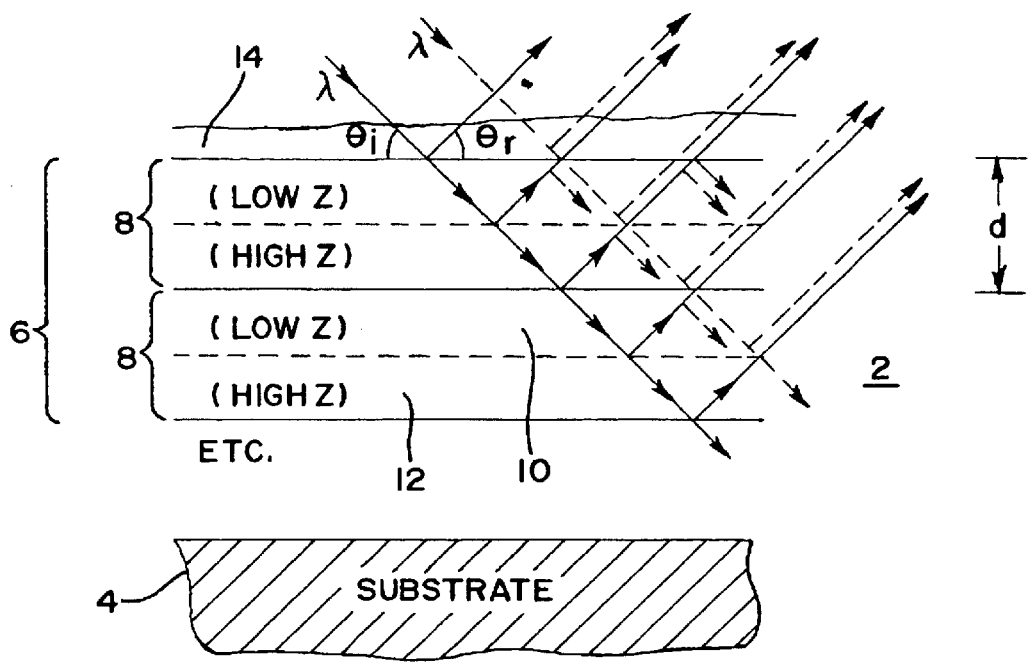
FIG. 1 is an exploded cross-sectional view of an embodiment of an optical element that includes a multilayer structure on a substrate in accordance with the present invention.

As shown in FIG. 1, an optical element 2 includes a substrate 4 with a multilayer structure 6 applied thereto. The multilayer structure 6 includes a plurality of layer sets 8 where each layer set 8 is made up of two separate layers of different materials: one with relatively high atomic number, or Z, and a second with relatively low atomic number. As shown in FIG. 1, the layer sets 8 are uniform, meaning that the d spacing does not vary either laterally or through the depth of the multilayer structure. The thickness d of each layer set 8 has a value ranging from approximately 1 nm to approximately 100 nm depending on the energies of the radiation to be reflected.

From about 10 to 1000 layer sets may be deposited on a substrate, depending on the desire qualities of the multilayer structure 6. The layer sets 8 preferably are composed of two material layers 10, 12 with diverse electron densities. Each of the material layers 10 and 12 preferably have a substantially identical thickness ranging from approximately 0.5 nm to approximately 50 nm. The absorber or high electron density layer 10 behaves like the plane of atoms in a crystal, while the low electron density layer 12 is analogous to the space between the planes. The high electron density layers 10 can include either W, Ni, Mo, Fe, Cr, Co, V, Mn, Nb, Ru, Rh, Pd, La, Ta, Re or Pt. The low electron density layer can include either silicon, carbon, $B_4C$, Be, Li, B, Al or Sc. Thus, examples of layer sets 8 are $WB_4C$, $NiB_4C$, NiC, WSi, MoSi or $MoB_4C$. Note that while the layer sets 8 of FIG. 1 show the low Z/low electron density layers 10 above the high Z/high electron density layers 12, it is possible to reverse their order without departing from the spirit of the invention so that the high Z layers 12 are above the low Z layers 10. If such reversal is performed, then the thicknesses of the various layers 10, 12 and the protective layer 14 are kept the same in the case where they are not reversed.

The substrate 4 upon which the layer sets 8 are produced must meet precise specifications. The surface of substrate 4 must be capable of being polished to roughness that is precise on an atomic level. The root mean squared surface roughness of the substrate of the preferred embodiment will range from 0.5 to 20 angstroms, measured at intervals of about 10 angstroms. Examples of material used for substrate 4 are silicon wafers, mica, quartz, zerodur, sapphire, germanium, pyrex, silicon carbide or other like substances as are described in U.S. Pat. No. 5,646,976, the entire contents of which are incorporated herein by reference.

In order to reduce the risk of radiation enhanced damage of the multilayer structure 6, a protective coating 14 is applied on the exterior surface 16 of the multilayer structure by such well known techniques as sputter down techniques, magnetron sputtering, e-beam evaporation, ion-beam sputtering, evaporation, electron beam implantation/plating. The protective coating 14 is generally made of a stable element like Silicon or a stable compound like SiC. The protective coating 14 has a thickness having a value ranging from approximately 60 Å to approximately 500 Å, which corresponds to a loss in reflectivity of about 0.5% to 1% for Cu Kα radiation depending on the material used and the thickness of the protective coating 14. In addition, the thickness of the protective coating 14 can vary depending on the wavelength of the incident radiation.

In the case of the protective coating 14 being silicon and the layer sets 8 being $NiB_4C$, air interacts with the silicon to form a very thin layer of the oxide $SiO_2$, which is known to be very resistant to radiation enhanced damage. The oxide reduces the possibility of the absorber layer 10 of Ni reacting with ionizing oxygen thereby extending its lifetime and the lifetime of the multilayer structure 6.

The embodiment of the optical element described above with respect to FIG. 1 uses a single layer for the protective coating. As will be explained below with respect to FIGS. 2 and 3, it is possible to embody the protective coating as a multi-layer structure. In particular, an optical element 2' shown in FIG. 2 includes a multilayer protective coating 14' deposited on the multilayer structure 6 and substrate 4 discussed previously with respect to FIG. 1. The multilayer protective coating 14' includes a plurality of layer sets 18 where each layer set 18 is made up of two separate layers of different materials: one with relatively high atomic number, or Z, and a second with relatively low atomic number. The multilayer protective coating 14' has two roles to perform: 1) act as a protective coating and 2) contribute to reflection.

The second role implies that the multilayer protective coating 14' will have a spacing d' that is the same as the spacing d of the multilayer structure 6. In particular, the layer sets 18 are uniform, wherein each layer set 18 has a spacing d' that has a value ranging from approximately 1 nm to approximately 100 n depending on the energies of the radiation to be reflected.

Figure 2:
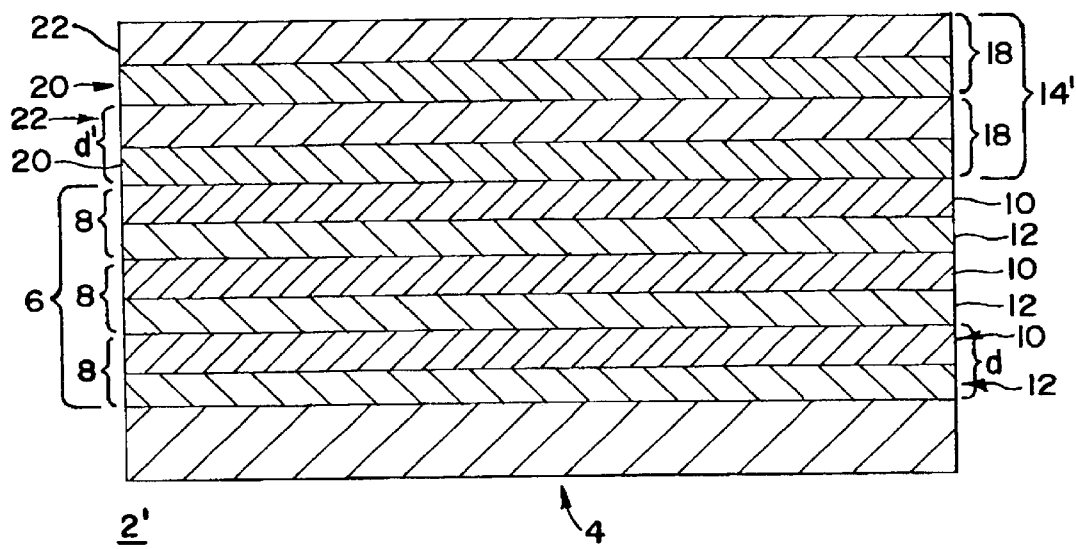
FIG. 2 is an enlarged cross-sectional view of a second embodiment of an optical element that includes a multilayer structure on a substrate in accordance with the present invention.

The layer sets 18 preferably are composed of two material layers 20, 22 with diverse electron densities. Each of the material layers 20 and 22 preferably has a substantially identical thickness having a value ranging from approximately 0.5 nm to approximately 50 nm. The absorber or high electron density layer 20 can include either W, Ni, Mo, Fe, Cr, Co, V, Mn, Nb, Ru, Rh, Pd, La, Ta, Re or Pt. While the high electron density layer 20 preferably is made of the same material as the high electron density layer 12 of the multilayer structure 6, it can be made of a different material. The low electron density layer 22 can include either silicon, carbon, $B_4C$, Be, Li, B, Al or Sc, wherein the low electron density layer 22 is made of a material that is different than the material of the low electron density layer 10 of the multilayer structure 6. The low electron density layer 22 should be more resistant to radiation damage than the low electron density layer 10 and should have a density that is as close as possible to the density of the low electron density layer 10. Note that while the layer sets 8 and 18 of FIG. 2 show the low Z/low electron density layers 10, 22 above the high Z/high electron density layers 12, 20, respectively, it is possible to reverse their order without departing from the spirit of the invention so that the high Z layers 12, 20 are above the low Z layers 10, 22. If such reversal is performed, then the thicknesses of the various layers 10, 20, 12 and 22 are kept the same in the case where they are not reversed. Normally, the number of layer sets 18 of the protective coating 14' is much smaller than the number of layer sets 8 of the multilayer structure 6. For example, if the number of layer sets 8 deposited for the multilayer structure 6 is, say, 80 then, the number of layer sets 18 deposited for the multilayer protective coating 14' is around 10.

There are several advantages for using a multilayer protective coating 14' instead of a single layer protective coating 14. For example, a single layer protective coating acts primarily as an absorber. That is, while it shields the multilayer structure from direct exposure to atmosphere, it also absorbs x-rays thereby reducing the reflectivity. On the other hand, deposition of a multilayer protective coating, while shielding the multilayer structure from direct exposure to atmosphere, also contributes to reflection. This implies that the loss of reflectivity is minimized. Another advantage of using a multilayer protective coating is that since such a coating contributes to reflection, many layers can be deposited which, in turn, increases the thickness of the protective coating thereby affording better protection to the multilayer structure.

A simple example of the above scheme is to deposit 80 layer sets 8 of Ni/C, which will act as the multilayer structure 6 and then deposit 10 layer sets 18 of Ni/Si on top of the multilayer structure 6, which will act as the multilayer protective coating 14'.

Figure 3:
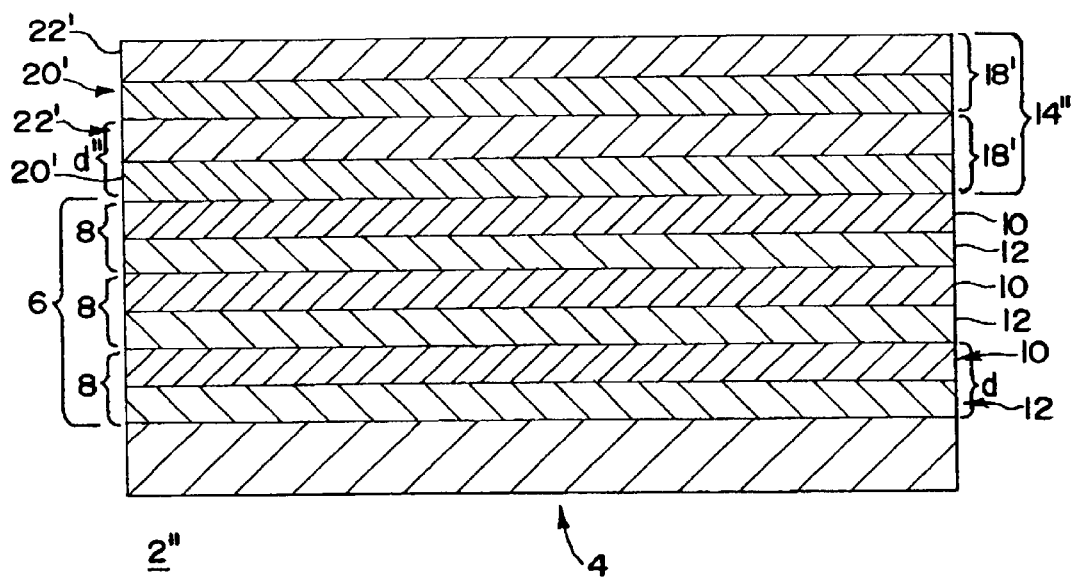
FIG. 3 is an enlarged cross-sectional view of a third embodiment of an optical element that includes a multilayer structure on a substrate in accordance with the present invention.

A second embodiment of an optical element that includes a multilayer protective is shown in FIG. 3. The optical element 6" includes a multilayer protective coating 14" deposited on the multilayer structure 6 and substrate 4 discussed previously with respect to FIG. 1. The multilayer protective coating 14" includes a plurality of layer sets 18' where each layer set 18' is made up of two separate layers of different materials, each with a relatively low atomic number. In contrast with the multilayer protective coating 14' of FIG. 2, the multilayer protective coating 14" does not significantly contribute to reflection. Instead, the multilayer protective coating 14" is designed to increase resistance to radiation damage by exploiting resistive properties of the layer sets 18'. Since the multilayer protective coating 14" does not significantly contribute to reflection, the spacing d' of the layer sets 18' may or may not be equal and need not be the same as the spacing d of the multilayer structure 6.

In this scheme, a single layer topcoat is replaced with multiple layers of light elements. Consider, for example, a multilayer of NiC. A single Si layer of thickness, say 100 Å, can be deposited in the embodiment of FIG. 1 or two layer sets 18' can be deposited, wherein each layer set 18' contains alternating 25 Å thick layers of Si and C, as shown in FIG. 3. In this scenario, the top layers do not contribute to reflection but afford the possibility of making the protective topcoat 14' more resistant to radiation damage by exploiting resistive properties of their combination. In this scenario, the thickness d" of the layer sets 18' may or may not be equal and need not be equal to the d spacing of the multilayer 6. The thicknesses of the layer sets 18' are primarily determined by a combination that affords the best protection.

The layer sets 18' preferably are composed of two material layers 20', 22' with similar electron densities. The low electron density layers 20', 22' each include either silicon, carbon, $B_4C$, Be, Li, B, Al or Sc, wherein the material of layer 20' differs from the material of layer 22'. The thicknesses and numbers of the layer sets 18' and layers 20' and 22' are chosen so as to maximize radiation protection for the multilayer structure 6. For example, two layer sets 18' having a spacing d" of 50 Å can be used, wherein each layer set 18' includes alternating layers 20' and 22' of Si and C. The layers 20' and 22' have equal thicknesses of 25 Å.

The multilayer structures 6 and protective coatings 14, 14', 14" described above with respect to FIGS. 1–3 can be applied in another of ways. For example, the multilayer structure 6 and protective coatings 14, 14', 14" can be used to form either flat or curved optical elements 2, 2', 2". An example of a method of forming flat and curved optical elements is described in U.S. Pat. No. 5,646,976, the entire contents of which are incorporated herein by reference.

Figure 4:
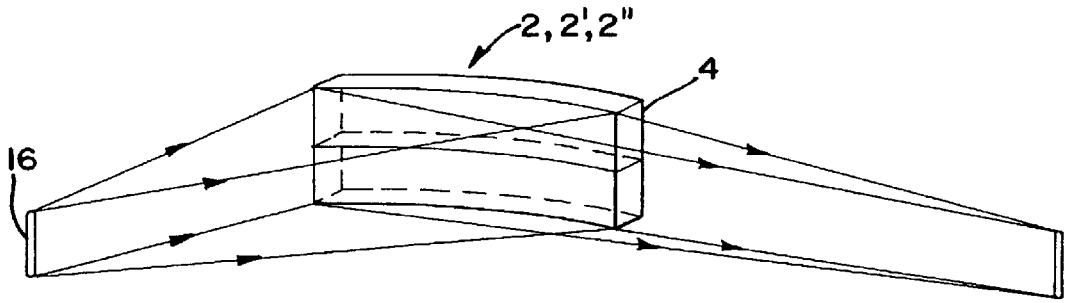
FIG. 4 is a perspective view of the optical element of FIG. 1, FIG. 2 or FIG. 3 being used to perform line-to-line imaging.

Proposed applications of such optical elements 2, 2', 2" include spectroscopy and diffractometry. As shown in FIG. 4, such systems include an x-ray source 16 that emits a set of x-rays that are directed to the optical elements 2, 2' or 2". X-rays pass through the protective layer 14, 14', 14" and are diffracted by the multilayer structure 6. The optical elements 2, 2', 2" could also be applied to focusing optics, for x-ray lithography and microscopy, in particular, optics for high resolution scanning x-ray microscopy, point-to-point imaging optics including multi-element systems, an optic for monochromatization of broad-band radiation, synchrotron radiation in particular. Many medical applications are also contemplated, in particular, as power filters to eliminate undesired energy or use in radiography where a high contrast image is desired.

While the above description constitutes the preferred embodiments of the present invention, it will be appreciated that the invention is susceptible of modification, variation and change without departing from the proper scope and fair meaning of the accompanying claims. For example, the optical elements can also be used for transformation beams of cold and thermal neutrons. In particular, they can be used for increasing density and uniformity of neutron flux or separation of the neutrons with different spin.

We claim:

1. An optical element for diffracting x-rays, comprising:
   a substrate;
   a diffraction structure applied to said substrate, said diffraction structure comprising an exterior surface facing away from said substrate and said diffraction structure capable of diffracting x-rays; and
   a protective layer applied to said exterior surface, wherein said protective layer has a structure that substantially absorbs x-rays.

2. The optical element of claim 1, wherein said protective layer comprises a stable material.

3. The optical element of claim 1, wherein said stable material is selected from the group consisting of silicon, carbon, $B_4C$, Be, Li, B, Al and Sc.

4. The optical element of claim 1, wherein said protective layer comprises a multilayer structure.

5. The optical element of claim 4, wherein said multilayer structure comprises a layer set, wherein said layer set comprises a first layer and a second layer made of a material different than said first layer.

6. The optical element of claim 5, wherein said first layer is adjacent to said second layer.

7. The optical element of claim 5, wherein said first layer comprises a first material with a relatively low atomic number, and said second layer comprises a second material, different than said first material, with a relatively low atomic number.

8. The optical element of claim 7, wherein said first material is selected from the group consisting of silicon, carbon, $B_4C$, Be, Li, B, Al and Sc.

9. The optical element of claim 8, wherein said second material is selected from the group consisting of silicon, carbon, $B_4C$, Be, Li, B, Al and Sc.

10. The optical element of claim 1, wherein said diffraction structure comprises a layer set, wherein said layer set comprises a first layer and a second layer made of a material different than said first layer.

11. The optical element of claim 10, wherein said protective layer comprises a multilayer structure comprising a second layer set, wherein said second layer set comprises a third layer and a fourth layer made of a material different than said third layer.

12. The optical element of claim 10, wherein said first layer comprises a first material with relatively high atomic number, and said second layer comprises a second material with a relatively low atomic number.

13. The optical element of claim 12, wherein said first material is selected from the group consisting of W, Ni, Mo, Fe, Cr, Co, V, Mn, Nb, Ru, Rh, Pd, La, Ta, Re and Pt.

14. The optical element of claim 13, wherein said second material is selected from the group consisting of silicon, carbon, $B_4C$, Be, Li, B, Al and Sc.

15. The optical element of claim 12, wherein said second material is selected from the group consisting of silicon, carbon, $B_4C$, Be, Li, B, Al and Sc.

16. The optical element of claim 12, wherein said first layer is adjacent to said second layer.

17. The optical element of claim 16, wherein said first material is selected from the group consisting of W, Ni, Mo, Fe, Cr, Co, V, Mn, Nb, Ru, Rh, Pd, La, Ta, Re and Pt.

18. The optical element of claim 17, wherein said second material is selected from the group consisting of silicon, carbon, $B_4C$, Be, Li, B, Al and Sc.

19. The optical element of claim 16, wherein said second material is selected from the group consisting of silicon, carbon, $B_4C$, Be, Li, B, Al and Sc.

20. The optical element of claim 10, wherein said first layer and said second layer are uniform.

21. The optical element of claim 20, wherein said first and said second layers have a substantially identical thickness.

22. The optical element of claim 21, wherein said first layer has a thickness having a value ranging from approximately 0.5 nm to approximately 50 nm.

23. An x-ray system, comprising:
    an x-ray source emitting a set of x-rays;
    an optical element, comprising:
        a substrate;
        a diffraction structure applied to said substrate, said diffraction structure comprising an exterior surface facing away from said substrate and said diffraction structure diffracting said set of x-rays; and
        a protective layer applied to said exterior surface, wherein said protective layer has a structure that substantially absorbs said set of x-rays.

24. The x-ray system of claim 23, wherein said protective layer comprises a stable material.

25. The x-ray system of claim 24, wherein said stable material is selected from the group consisting of silicon, carbon, $B_4C$, Be, Li, B, Al and Sc.

26. The x-ray system of claim 23, wherein said protective layer comprises a multilayer structure.

27. The x-ray system of claim 26, wherein said multilayer structure comprises a layer set, wherein said layer set comprises a first layer and a second layer made of a material different than said first layer.

28. The x-ray system of claim 27, wherein said first layer is adjacent to said second layer.

29. The x-ray system of claim 27, wherein said first layer comprises a first material with a relatively low atomic number, and said second layer comprises a second material, different than said first material, with a relatively low atomic number.

30. The x-ray system of claim 29, wherein said first material is selected from the group consisting of silicon, carbon, $B_4C$, Be, Li, B, Al and Sc.

31. The x-ray system of claim 30, wherein said second material is selected from the group consisting of silicon, carbon, $B_4C$, Be, Li, B, Al and Sc.

32. The x-ray system of claim 23, wherein said diffraction structure comprises a layer set, wherein said layer set comprises a first layer and a second layer made of a material different than said first layer.

33. The x-ray system of claim 32, wherein said protective layer comprises a multilayer structure comprising a second layer set, wherein said second layer set comprises a third layer and a fourth layer made of a material different than said third layer.

34. The x-ray system of claim 32, wherein said first layer comprises a first material with relatively high atomic number, and said second layer comprises a second material with a relatively low atomic number.

35. The x-ray system of claim 34, wherein said first material is selected from the group consisting of W, Ni, Mo, Fe, Cr, Co, V, Mn, Nb, Ru, Rh, Pd, La, Ta, Re and Pt.

36. The x-ray system of claim 35, wherein said second material is selected from the group consisting of silicon, carbon, $B_4C$, Be, Li, B, Al and Sc.

37. The x-ray system of claim 34, wherein said second material is selected from the group consisting of silicon, carbon, $B_4C$, Be, Li, B, Al and Sc.

38. The x-ray system of claim 34, wherein said first layer is adjacent to said second layer.

39. The x-ray system of claim 38, wherein said first material is selected from the group consisting of W, Ni, Mo, Fe, Cr, Co, V, Mn, Nb, Ru, Rh, Pd, La, Ta, Re and Pt.

40. The x-ray system of claim 39, wherein said second material is selected from the group consisting of silicon, carbon, $B_4C$, Be, Li, B, Al and Sc.

41. The x-ray system of claim 38, wherein said second material is selected from the group consisting of silicon, carbon, $B_4C$, Be, Li, B, Al and Sc.

42. The x-ray system of claim 32, wherein said first layer and said second layer are uniform.

43. The x-ray system of claim 42, wherein said first and said second layers have a substantially identical thickness.

44. The x-ray system of claim 43, wherein said first layer has a thickness having a value ranging from approximately 0.5 nm to approximately 50 nm.

45. The x-ray system of claim 23, wherein said set of x-rays are hard x-rays.

* * * * *

UNITED STATES PATENT AND TRADEMARK OFFICE
CERTIFICATE OF CORRECTION

PATENT NO.     : 6,643,353 B2
DATED          : November 4, 2003
INVENTOR(S)    : Boris Verman et al.

It is certified that error appears in the above-identified patent and that said Letters Patent is hereby corrected as shown below:

Title page,
Item [75], Inventors, delete "Seshardi," and substitute -- Seshadri, -- in its place.
Item [56], References Cited, U.S. PATENT DOCUMENTS, delete "7/1985" and substitute -- 6/1985 -- in its place.

Signed and Sealed this

Second Day of November, 2004

JON W. DUDAS
*Director of the United States Patent and Trademark Office*